(12) United States Patent
Sah et al.

(10) Patent No.: US 7,497,803 B2
(45) Date of Patent: Mar. 3, 2009

(54) METHOD AND APPARATUS TO CONTROL AN ELECTRO-HYDRAULIC TRANSMISSION DURING SHIFTING EVENT

(75) Inventors: Jy-Jen F. Sah, West Bloomfield, MI (US); Lawrence A. Kaminsky, Sterling Heights, MI (US)

(73) Assignees: GM Global Technology Operations, Inc., Detroit, MI (US); Electronic Data Systems Corporation, Plano, TX (US)

( * ) Notice: Subject to any disclaimer, the term of this patent is extended or adjusted under 35 U.S.C. 154(b) by 390 days.

(21) Appl. No.: 11/462,467

(22) Filed: Aug. 4, 2006

(65) Prior Publication Data

US 2008/0032855 A1    Feb. 7, 2008

(51) Int. Cl.
*B60K 1/02* (2006.01)
(52) U.S. Cl. .......................................... 477/3
(58) Field of Classification Search ................. 903/911, 903/945; 477/906, 3; 475/5
See application file for complete search history.

(56) References Cited

U.S. PATENT DOCUMENTS 5,873,426 A * 2/1999 Tabata et al. ............... 180/65.7
6,554,736 B2 * 4/2003 Takano et al. .................. 477/5

* cited by examiner

*Primary Examiner*—Dirk Wright

(57) ABSTRACT

A method and control system is presented to selectively actuate a plurality of clutches of a two-mode, compound-split, electro-mechanical transmission. The method comprises executing a shift operation from a first to a second operating mode and monitoring shift abort criteria. A revised shift operation is executed to control the transmission shift into a third operating mode effective to meet an operator request for output torque. The exemplary transmission has four fixed gear ratio modes and two continuously variable modes. The preferred shift abort criteria include: monitoring the operator request for output torque; identifying presence of a fault in an oncoming torques transfer device effective to facilitate operation in the second operating mode; monitoring an optimization routine for managing torque inputs from the plurality of torque-generative devices.

21 Claims, 4 Drawing Sheets

METHOD AND APPARATUS TO CONTROL AN ELECTRO-HYDRAULIC TRANSMISSION DURING SHIFTING EVENT

TECHNICAL FIELD

This invention pertains generally to powertrain control systems for powertrain systems having electro-mechanical transmissions, and more specifically to powertrain control during transmission shifts.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

Engineers implementing powertrain systems having electro-transmissions are tasked with developing shifting schemes between various operating modes, including fixed gear modes and continuously variable modes. During execution of a shift, there can be a change in operating conditions which necessitate aborting execution of the shift. In aborting a shift, there is a need to maintain control of the transmission output to ensure that the operator is not adversely affected as a result.

Therefore, there is a need to for a method and apparatus to control operation of a powertrain system including an electro-mechanical transmission during gear shifting events, to address concerns mentioned hereinabove.

SUMMARY OF THE INVENTION

In order to address the concerns raised hereinabove, an article of manufacture is provided to effect a method to control torque output after a shift abort from a transmission device of an exemplary powertrain.

In accordance with the present invention, there is provided an article of manufacture, comprising a storage medium having a computer program encoded therein for effective method to selectively actuate a plurality of torque-transfer devices of a transmission device operative to receive torque inputs from a plurality of devices and operative to transmit an output torque therefrom. The method comprises executing a shift operation from a first operating mode to a second operating mode and monitoring shift abort criteria. A revises shift operation is executed to control the transmission shift into a third operating mode effective to substantially meet an operator request for output torque, including shifting into the third operating mode when one of the shift abort criteria is met.

An aspect of the invention includes the transmission device comprising a two-mode, compound-split, electro-mechanical transmission having four torque-transfer devices wherein the transmission is operable in one of four fixed gear ratio modes and two continuously variable modes. The transmission device is operably connected to a plurality of torque-generative devices comprising first and second electrical machines and an internal combustion engine.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
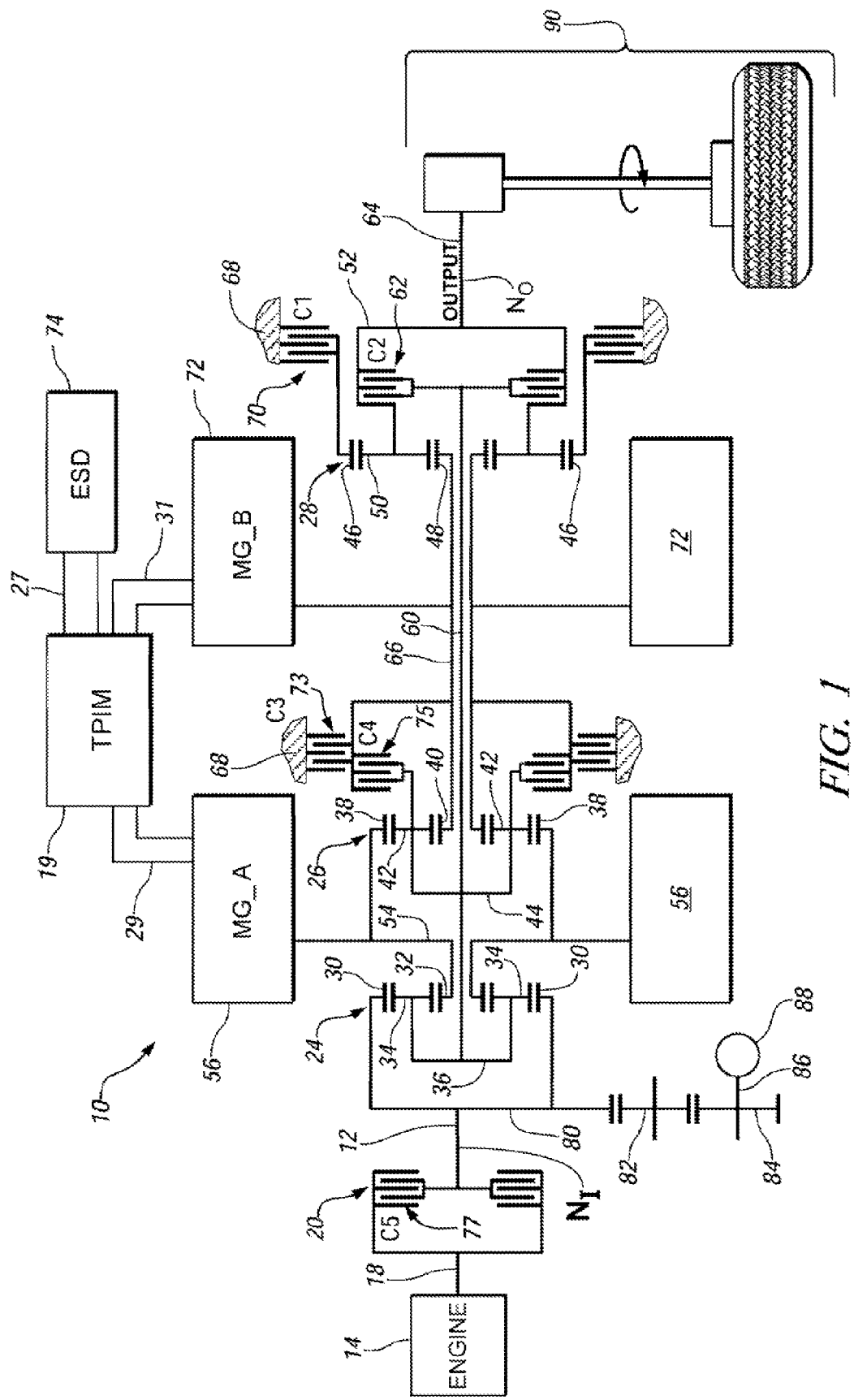
FIG. 1 is a schematic diagram of an exemplary powertrain, in accordance with the present invention.
Figure 2:
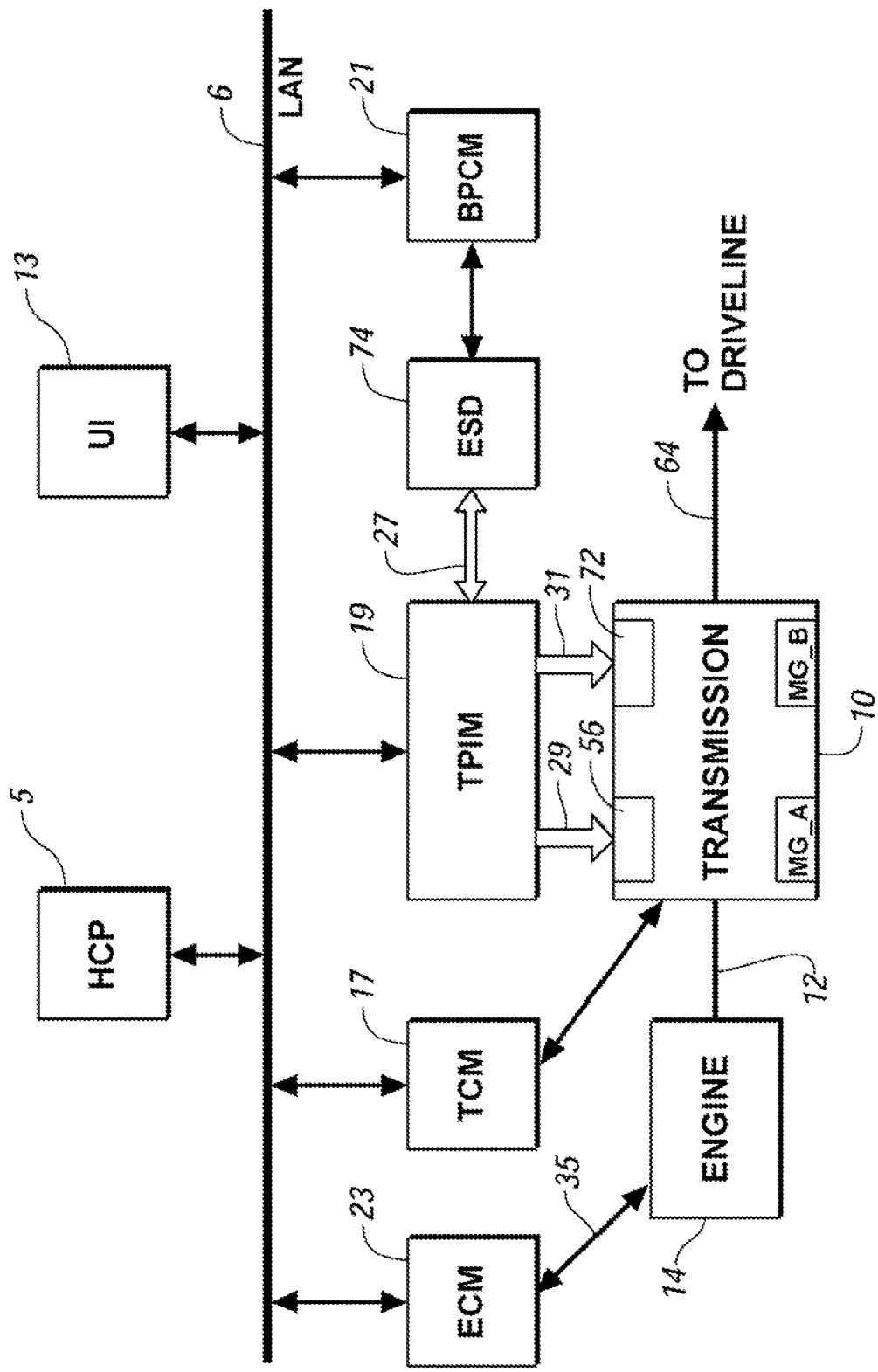
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring, shown respectively as 78 and 79. The transient torque damper 20 permits selective engagement of the engine 14 with the transmission 10, but it must be understood that the torque transfer device 77 is not utilized to change, or control, the mode in which the transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. The engine 14 is connected to the input member 12 which is connected to a planetary gear set 24 in the transmission 10.

Referring specifically now to FIG. 1, the transmission 10 utilizes three planetary-gear sets 24, 26 and 28. The first planetary set 24 has an outer ring gear member 30 which circumscribes an inner, or sun gear member 32. A plurality of planetary gear members 34 are rotatably mounted on a carrier 36 such that each planetary gear member 34 meshingly engages both the outer gear member 30 and the inner gear member 32.

The second planetary gear set 26 also has an outer ring gear member 38, which circumscribes an inner sun gear member 40. A plurality of planetary gear members 42 are rotatably mounted on a carrier 44 such that each planetary gear 42 meshingly engages both the outer gear member 38 and the inner gear member 40.

The third planetary gear set 28 also has an outer ring gear member 46, which circumscribes an inner sun gear member 48. A plurality of planetary gear members 50 are rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are connected to a first electrical machine comprising a motor/generator 56, also referred to as "MG-A".

The planetary gear set 24 and 28 are further compounded in that the carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device 62 which, as will be hereinafter more fully explained, is employed to assist in the selection of the operational modes of the transmission 10. The carrier 52 of the third planetary gear set 28 is connected directly to the transmission output member 64.

In the embodiment described herein, wherein the transmission 10 is used in a land vehicle, the output member 64 is operably connected to a driveline 90 comprising a gear box or other torque transfer device which provides a torque output to one or more vehicular axles or half-shafts. The axles terminate in drive members, which may be either front or rear wheels of the vehicle on which they are employed, or they may be a drive gear of a track vehicle.

The inner gear member 40 of the second planetary gear set 26 is connected to the inner gear member 48 of the third planetary gear set 28, through a sleeve shift 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the transmission 10. The sleeve shaft 66 is also connected to a second electrical machine comprising a motor/generator 72, referred to as MG-B All the planetary gear sets 24, 26 and 28 as well as MG-A and MG-B 56 and 72 are preferably coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72.

A torque transfer device 72 selectively connects the sun gear 40 with ground, i.e., with transmission housing 68. A torque transfer device, i.e. C4 75 is operative as a lock-up clutch, locking planetary gear sets 24, 26, MG-A and MG-B 56, 72 and the input to rotate as a group, by selectively connecting the sun gear 40 with the carrier 44. The torque transfer devices 62, 70, 73, 75 are all preferably friction clutches, respectively referred to as follow: clutch C1 70, clutch C2 62, clutch C3 73, and clutch C4 75. Each clutch is preferably hydraulically actuated, receiving pressurized hydraulic fluid from a pump when a corresponding clutch control solenoid is actuated. Hydraulic actuation of each of the clutches is accomplished using a hydraulic fluid circuit having a plurality of fluidic pressure solenoids and flow management valves, which is not described in detail herein.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more batteries. Other electrical energy and electrochemical energy storage devices that have the ability to store electrical power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module ('TPIM') 19 via DC lines or transfer conductors 27. The TPIM 19 is an element of the control system described hereinafter with regard to FIG. 2. The TPIM 19 communicates with the first electrical machine 56 by transfer conductors 29, and the TPIM to similar communicates with the second electrical machine 72 by transfer conductors 31. Electrical current is transferable to or from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC lines and provides AC current to the respective electrical machine, i.e. MG-A and MG-B, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MG-A 56 and MG-B 72 are three-phase AC machines and the inverters comprise complementary three-phase power electronics.

Referring again to FIG. 1, a drive gear 80 may be driven from the input member 12. As depicted, the drive gear 80 fixedly connects the input member 12 to the outer gear member 30 of the first planetary gear set 24, and the drive gear 80, therefore, receives power from the engine 14 and/or the electrical machines 56 and/or 72 through planetary gear sets 24 and/or 26. The drive gear 80 meshingly engages an idler gear 82 which, in turn, meshingly engages a transfer gear 84 that is secured to one end of a shaft 86 secured to a hydraulic/transmission fluid pump 88.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPM')19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain through a request for torque including the transmission 10. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery back, the HCP 5 generates various commands, including: an operator torque an engine torque command, clutch torque commands for the various clutches C1, C2, C3, C4 of the transmission 10; and motor torque commands.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual engine torque input to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_i$) to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_o$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The Transmission Power Inverter Module (TPIM) 19 includes a pair of power inverters and motor control modules configured to receive motor control commands and control inverter states therefrom to provide motor drive or regeneration functionality. The TPIM 19 is operable to generate torque commands for MG-A 56 and MG-B 72 based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B respectively, are derived by the TPIM 19 from the motor phase information or conventional rotation sensors. The TPIM 19 determines and communicates motor speeds to the HCP 5. The electrical energy source device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested output torque at shaft 64, also referred to as an operator torque request. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines output torque which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output.

The two-mode, compound-split, electro-mechanical transmission, includes output member 64 which receives output torque through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio 1 (GR1) | C1 70 | C4 75 |
| Fixed Ratio 2 (GR2) | C1 70 | C2 62 |
| Mode II | C2 62 | |
| Fixed Ratio 3 (GR3) | C2 62 | C4 75 |
| Fixed Ratio 4 (GR4) | C2 62 | C3 73 |

The various transmission operating modes described in the table indicate which of the specific clutches C1, C2, C3, C4 are engaged or actuated for each of the operating modes. Additionally, in various transmission operating modes, MG-A and MG-B may each operate as electrical motors to generate motive torque, or as a generator to generate electrical energy. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_o$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as shown in the table, above.

When the additionally clutch is applied, fixed ratio of input-to-output speed of the transmission, i.e. $N_i/N_o$, is achieved. The rotations of machines MG-A and MG-B 56, 72 are dependent on internal rotation of the mechanism as defined by the clutching and proportional to the input speed, $N_i$, determined or measured at shaft 12. The machines MG-A and MG-B function as motors or generators.

Figure 3:
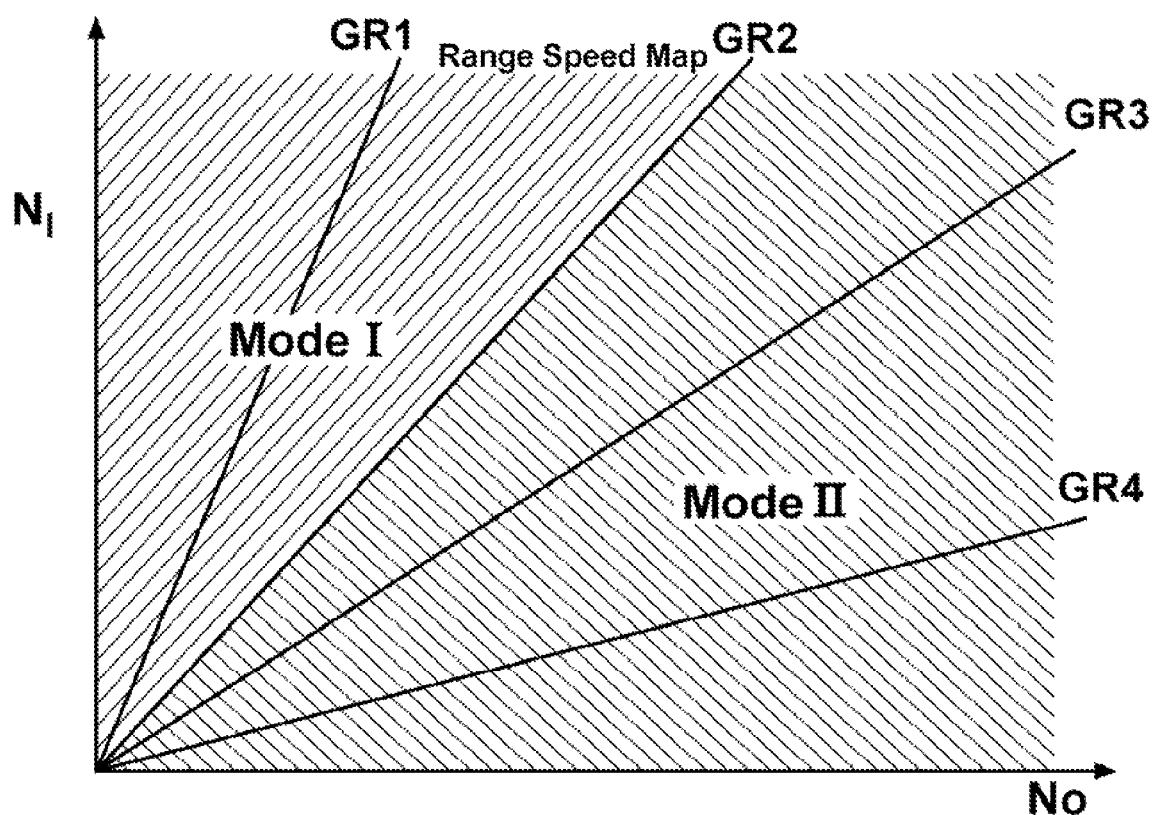
FIG. 3 is am exemplary data graph, in accordance with the present invention.

Referring now to FIG. 3, various transmission operating modes are plotted as a function of transmission output speed, $N_o$, and transmission input speed, $N_i$ for the exemplary transmission and control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating mode is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention.

Selection of the mode of operation of the transmission depends primarily on operator input and the ability of the powertrain to meet that input. Referring again to FIG. 3 and Table 1, a first range falls primarily within mode I operation when clutches C1 70 and C4 75 are engaged. A second range falls within mode I and mode II when clutches C2 62 and C1 70 are engaged. The first fixed gear ratio is available during mode I, when clutches C1 and C4 are engaged. The second fixed gear ratio is available during mode I, when clutches C1 and C2 are engaged. The third fixed ratio range is available during mode II when clutches C2 62 and C4 75 are engaged, and the fourth fixed ratio range is available during mode II when clutches C2 62 and C3 73 are engaged. It should be recognized that the first and second ranges of continuously variable operation for Mode I and Mode II may overlap.

Output of the exemplary powertrain system described hereinabove is constrained due to mechanical and system limitations. The output speed, $N_o$, of the transmission measured at shaft 64 is limited due to limitations of engine output speed and transmission input speed, $N_i$, measured at shaft 12, and speed limitations of the MG-A and MG-B. Output torque of the transmission 64 is similarly limited due to limitations of the engine input torque and input torque measured at shaft 12 after the transient torque damper 20, and torque limitations of MG-A and MG-B 56, 72.

In operation, a shift occurs in the exemplary transmission due to a variety of operating characteristics of the powertrain. There may be a change in demand for an operator demand for torque, typically monitored at shaft 64. Such demands are typically communicated through inputs to the UI 13 as previously described. Additionally, a change in demand for output torque may be predicated on a change in external conditions, including, e.g., changes in road grade, road surface conditions, or wind load. A shift change may be predicted on a change in powertrain torque demand caused by a control module command to change one of the electrical machines between electrical energy generating mode and torque generating mode. A shift change may be predicted on a change in an optimization algorithm or routine operable to determine optimum system efficiency based upon operator demand for power, battery state of charge, and energy efficiencies of the engine 14 and MG-A and MG-B 56, 72. The control system manages torque inputs form the engine 14 and MG-A and MG-B 56, 72 based upon an outcome of the executed optimization routine, and there can be changes in system optimization that compel a shift change in order to optimize system efficiencies to improve fuel economy and manage battery charging. Furthermore, a shift change may be predicted upon a fault in a component or system.

The distributed control architecture acts in concert to determine a need for a change in the transmission operating state, and executes the foregoing to effect the change in gear. Permissible transitions between the various transmission operating modes for the exemplary transmission are shown, with reference to Table 2, below.

TABLE 2

| Transmission Operating Mode | Permissible Shift Options |
|---|---|
| Mode I | GR1, GR2, Neutral |
| Mode II | GR2, GR3, GR4, Neutral |
| GR1 | Mode I, GR2, Neutral |
| GR2 | Mode I, Mode II, GR1, GR3, GR4, Neutral |
| GR3 | GR2, GR4, Mode II, Neutral |
| GR4 | GR2, GR3, Mode II, Neutral |
| Neutral | Mode I, Mode II |

A shift change in the exemplary system comprises one of at least three possible situations, consistent with the permissible shifts shown in Table 2. There can be a shift from one fixed gear to a second fixed gear. There can be a shift from a fixed gear to one of the continuously variable modes. There can be a shift from one of the continuously variable modes to a fixed gear.

When a shift is from one fixed gear to a second fixed gear, the shift process includes deactivating an off-going clutch, and actuating an oncoming clutch. By way of example, in shifting from GR1 to GR2, off-going clutch C4 75 is deactivated, and oncoming clutch C2 62 is actuated, permitting it to transmit torque. Clutch C1 70 is actuated throughout the process. Actuating an oncoming clutch preferably includes synchronizing the speeds of the elements of the oncoming clutch by controlling the torque-generative devices and, if necessary, controlling slippage of the oncoming clutch.

A shift change out of any of the fixed gear operating modes is a multi-step process, wherein torque transmitted across the off-going clutch is preferably offloaded prior to its deactivation. Offloading torque across the off-going clutch includes adjusting torque-carrying across other torque-transmission paths, e.g. using MG-A or MG-B, and the oncoming clutch. Deactivating an off-going clutch comprises decreasing the torque-carrying capacity of the off-going clutch by reducing hydraulic pressure through control of one of the solenoids, as previously described.

To effect a shift into a fixed gear, torque is offloaded from the off-going clutch and it is deactivated. An input side of the oncoming clutch is preferably synchronized with the speed of an output of the oncoming clutch and slippage is controlled to minimize heat generation in the oncoming clutch while preventing or reducing driveline jerks and lurches. The oncoming clutch is actuated by controlling hydraulic pressure applied to the clutch to a magnitude sufficient to hold the clutch with zero slip across the clutch elements. Regardless of the type of shift being executed, a shift change takes a finite amount of time to execute, typically targeted for less than one second, and is predicated upon specific circumstances that are monitored and controlled by the control system described hereinabove.

During execution of a shift, there can be a detectable change in operation which causes the control system to abort the shift change currently in process. Such operating changes are analogous to those which initiated the shift change, i.e. a subsequent change in demand for output torque due to operator input or external conditions, a command by the control module to change one of the electrical machines between electrical energy generating mode and torque generating mode, a change in the optimization algorithm operable to optimize system efficiency, or a fault in a component or system, including a fault in an oncoming clutch. Specific parametric threshold values for each of the abort criteria are calibrated for a specific application.

The invention generally comprises an algorithm resident in one of the modules of the control system and executed therein, which acts to implement a method to effect a shift from a first operating mode to a second operating mode, based upon criteria previously described. The algorithm monitors the detectable changes in operation which comprises the shift abort criteria, described above. When one of the abort criteria is met, a revised shift operation is executed, which controls shift execution into a third operating mode. The selected third operating mode is selected as being an operating mode which is effective to substantially meet the operator request for output torque, $T_o$ as currently determined. This is described in greater detail.

Figure 4:
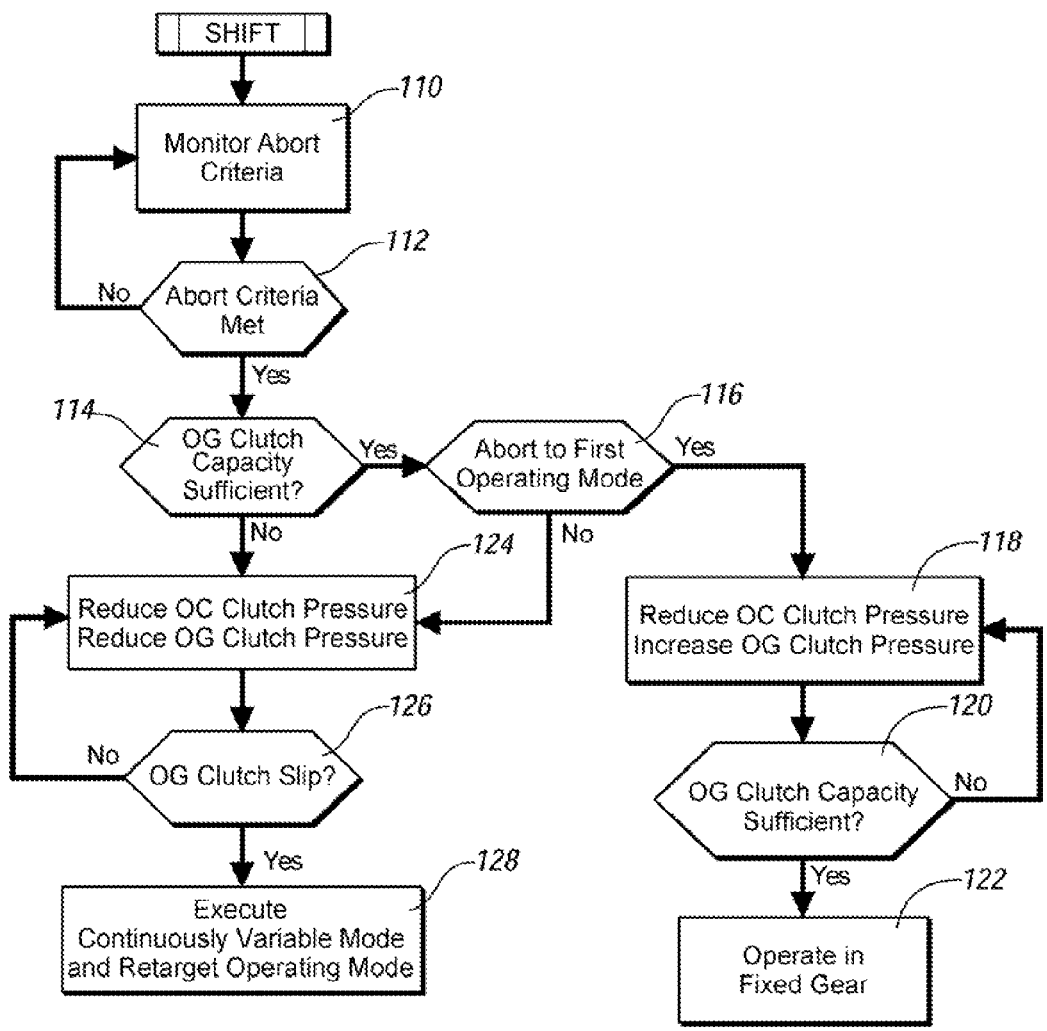
FIG. 4 is a logic flow chart, in accordance with the present invention.

Referring now to FIG. 4, a logic flow chart, executed as an algorithm in the control system described with reference to FIG. 2 for controlling the powertrain system described with reference to FIG. 1, is described for a situation wherein a command to abort the shift occurs during a period when the off-going clutch is not completely deactivated. In this situation, the control system monitors whether any of the abort criteria have been met during a shifting event (Blocks 110, 112). When one of the abort criteria has been met, it is determined whether the off-going ('OG') clutch has sufficient carrying capacity, i.e. hydraulic pressure, to continue operation (Block 114). When the off-going clutch has sufficient carrying capacity, the control system determines whether to abort back to the previously commanded fixed gear, or, alternatively, whether a shift to another allowable operating mode has been commanded based upon a change in operating conditions (Block 116). If the control system chooses to abort to the original fixed gear, hydraulic pressure is increased to the previously off-going clutch, and the hydraulic pressure is decreased to the previously oncoming ('OC') clutch, if any (Block 118). This change in hydraulic pressures to the off-going and oncoming clutches is continued until the clutch capacity of the previously off-going clutch is sufficient to transmit torque thereacross (Block 120), and operation continues (Block 122). When the off-going clutch does not have sufficient carrying capacity (block 114), or when a shift to another operating mode has been commanded based upon the changed situation (Block 116), the control system continues to command a reduction in hydraulic pressure to the off-going clutch (Block 124), permitting its deactivation in time, once slippage of the off-going clutch is observed, typically based upon measurement on output speed $N_o$ (Block 126). Pressure to the oncoming clutch is similarly reduced, preventing its actuation (block 124). The third operating mode is selected as one of the continuously variable Mode operating modes, i.e. in Modes I or Mode II (Block 128), and a new operating range is subsequently determined and executed as a shift event, e.g. to another fixed gear. The above-described situation is applicable to shift changes when the off-going operating mode is one of the fixed gears.

Figure 5:
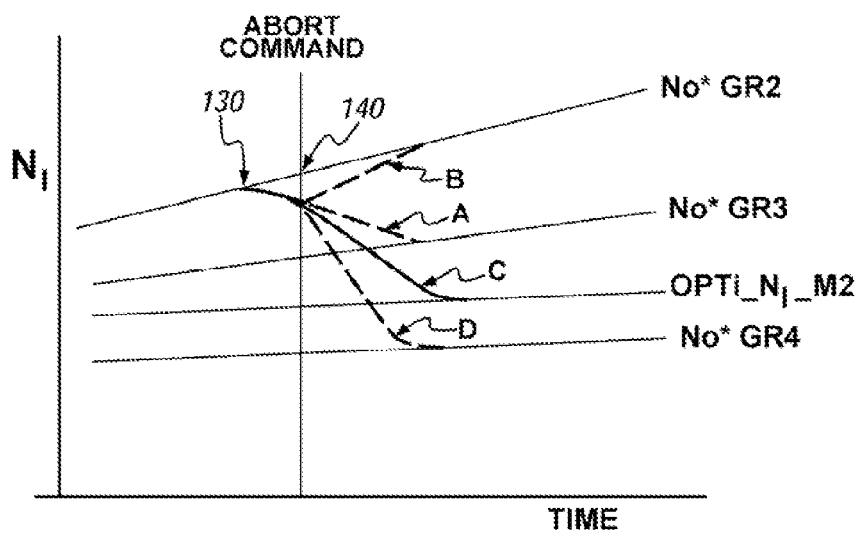
FIG. 5 is an exemplary data graph, in accordance with the present invention.

FIG. 5 comprises an exemplary data graph of transmission input speed, $N_i$, as a function of time, and showing a situation wherein a command to abort a shift event occurs after the off-going clutch has been deactivated, in this example shown as a shift event from GR2 to GR3 (Line A), wherein clutch C1 70 has been deactivated (Point 130). At Point 140, there is a command to abort the shift event, as previously described. In this situation, the selected third operating mode which the control system can command includes a return to GR2 (Line B), or a shift to GR4 (Line C) or to an optimal operating line for continuously variable Mode 2, shown as Opti_$N_i$_M2 (Line D). Regardless of the selected third operating mode, the control system selectively controls operation of the engine, MG-A, and MG-B to achieve a transmission output which is effective to substantially meet the operator request for output torque as currently determined. In these circumstances, operating speeds of the engine, MG-A, and MG-B are selectively controlled to meet the output speed $N_o$ of the transmission to meet the output torque.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to selectively actuate a plurality of torque-transfer devices of a torque-transmission device operative to receive torque inputs from a plurality of devices and operative to generate an output torque, comprising:

executing a shift operation from a first operating mode to a second operating mode;

monitoring shift abort criteria; and, executing a revised shift operation into a third operating mode effective to substantially meet an operator request for output torque.

2. The method of claim 1, wherein effecting a revised shift operation into a third operating mode effective to substantially meet and operator request for output torque further comprises executing there revised shift operation into the third operating mode when one of the shift abort criteria is met.

3. The method of claim 2, wherein monitoring the shift abort criteria comprises monitoring an operator request for output torque, a presence of a fault in an oncoming torque-transfer device, and an optimization routine for managing torque inputs from the plurality of devices.

4. Article of manufacture, comprising a storage medium having a computer program encoded therein for effecting a method to selectively actuate a plurality of torque-transfer devices of a transmission device operative to receive torque inputs from a plurality of devices and operative to transmit an output torque, the program comprising:
   code to execute a shift operation from a first operating mode to a second operating mode;
   code to monitor shift abort criteria; and,
   code to execute a revised shift operation into a third operating mode effective to substantially meet an operator request for output torque.

5. The article of manufacture of claim 4, wherein the code to execute a revised shift operation into a third operating mode effective to substantially meet an operator request for output torque further comprises code to execute the revised shift operation into the third operation mode when one of the shift abort criteria is met.

6. The article of manufacture of claim 5, wherein the transmission device comprises a two-mode, compound-split, electro-mechanical transmission having four torque-transfer devices, the transmission operative in one of four fixed gear ratio modes and two continuously variable modes.

7. The article of manufacture of claim 6, wherein the transmission device operative to receive torque inputs from a plurality of devices comprises the transmission operably connected to a plurality of torque-generative devices comprising first and second electrical machines and an internal combustion engine.

8. The article of manufacture of claim 7, wherein the code to monitor the shift abort criteria comprises code to monitor the operator request for output torque.

9. The article of manufacture of claim 7, wherein the code to monitor the shift abort criteria comprises code to identify presence of a fault in an oncoming torque transfer device effective to facilitate operation in the second operating mode.

10. The article of manufacture of claim 7, wherein the code to monitor the shift abort criteria comprises code to monitor an optimization routine for managing torque inputs from the plurality of torque-generative devices.

11. The article of manufacture of claim 7, wherein the code to execute a revised shift operation into a third operating ode effective to substantially meet an operator request for output torque further comprises code to control operation of the first and second electrical machines and the internal combustion engine.

12. The article of manufacture of claim 6, wherein the third operating mode comprises the first operating mode when an off-going torque-transfer device has sufficient torque-carrying capacity.

13. The article of manufacture of claim 6, wherein the code to execute a revised shift operation into a third operating mode effective to substantially meet an operator request for output torque further comprises code to execute a shift operation into a continuously variable mode operation.

14. The article of manufacture of claim 6, wherein the third transmission operating mode comprises one of the second fixed gear ratio, the first continuously variable mode, and the second continuously variable mode, when the first transmission operating mode comprises the first fixed gear ratio.

15. The article of manufacture of claim 6, wherein the third transmission operating mode comprises one of the first fixed gear ratio, the third fixed gear ration, the fourth fixed gear ratio, the first continuously variable mode, and the second continuously variable mode when the first transmission operating mode comprises the second fixed gear ratio.

16. The article of manufacture of claim 6, wherein the third transmission operating mode comprises one of the first fixed gear ratio, the second fixed gear ratio, and the fourth fixed gear ratio when the first transmission operating mode comprises the third fixed gear ratio.

17. The article of manufacture of claim 6, wherein the third transmission operating mode comprises one of the second fixed gear ratio and the third fixed gear ratio when the first transmission operating more comprises the fourth fixed gear ratio.

18. The article of manufacture of claim 6, wherein the third transmission operating mode comprises one of the first fixed gear ratio and the second fixed gear ratio when the first transmission operating mode comprises the first continuously variable mode.

19. The article of manufacture of claim 6, wherein the third transmission operating mode comprises one the second fixed gear ratio when the first transmission operating mode comprises the second continuously variable mode.

20. Control system for a two-mode compound-split, electro-mechanical transmission operative in one of a plurality of operating modes comprising four fixed gear ratio modes and two continuously variable modes, including a storage medium having an encoded computer program, the computer program comprising:
   code to execute a shift operation from a first operating mode to a second operating mode;
   code to monitor shift abort criteria; and,
   code to execute a revised shift operation into a third operating mode effective to substantially meet and operator request for output torque from the transmission.

21. The control system of claim 20, wherein code to monitor the shift abort criteria comprises code to monitor an operator request for output torque, a presence of a fault in an oncoming torque-transfer device, and an optimization routine for managing torque inputs from the plurality of devices.

* * * * *